3,458,320
METHOD OF PROCESSING COFFEE
William W. Niven, Jr., Prairie Village, Kans., assignor, by mesne assignments, to The Folger Coffee Company, Cincinnati, Ohio, a corporation of Ohio
Continuation of application Ser. No. 356,593, Apr. 1, 1964. This application Jan. 26, 1968, Ser. No. 701,012
Int. Cl. A23f 1/08
U.S. Cl. 99—71                                    2 Claims

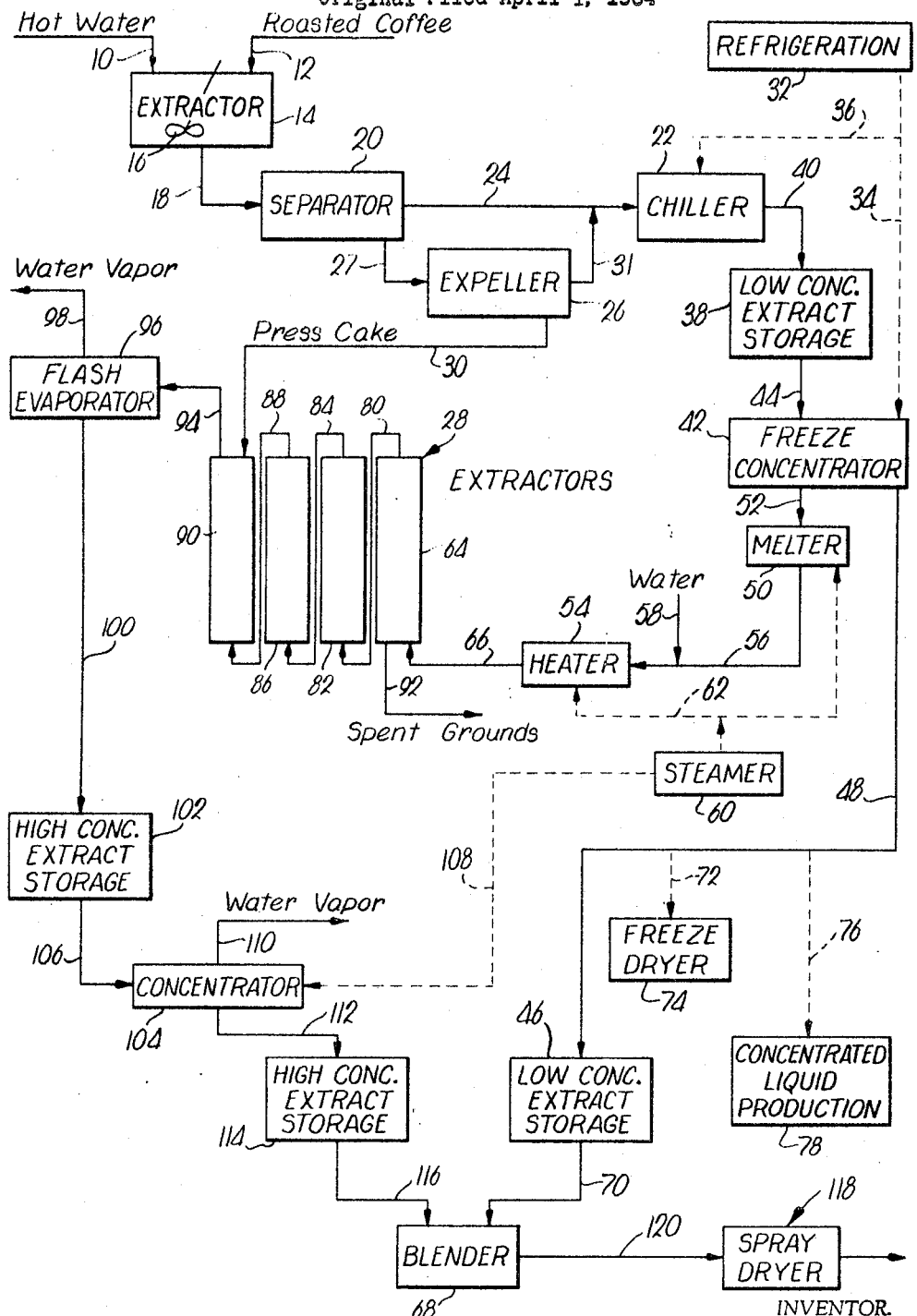

ABSTRACT OF THE DISCLOSURE

Instant coffee is produced by a dual extraction process in which the two coffee extracts are ultimately combined to provide the final product. In the first extraction water at a temperature of 210° F. is added to ground coffee in the ratio of 2.5 to 4.5 parts by weight of water to each part of ground coffee. The mixture is permitted to reach equilibrium conditions, resulting in the production of a coffee extract having approximately 7% by weight of the water soluble components of the ground coffee therein. The remaining grounds are then subjected to the second extraction process.

---

This application is a continuation of application Ser. No. 356,593 filed Apr. 1, 1964, and now abandoned.

This invention relates to an improved method of producing a coffee product of the instant type suitable for addition to hot or cold water to make a coffee beverage, and particularly to a novel process for preparing the coffee product to render the beverage prepared therefrom substantially indistinguishable from a flavor and aroma standpoint, from fresh brewed coffee beverage.

Freshly brewed coffee beverage is normally prepared by contacting roasted ground coffee with hot water to extract water soluble constituents from the coffee. Generally speaking, this prepared beverage is then consumed while still fresh, and it has a distinctive flavor and aroma depending principally on the blend and roast of the coffee beans used in preparing the ground coffee, and the time period which elapses between preparation of the beverage and consumption thereof. Consumers have come to recognize the taste and aroma of freshly brewed coffee and for the most part, prefer a freshly prepared beverage to coffee which has been prepared in this way but is not consumed for a long period after preparation thereof, or to so-called instant products which are either in liquid or dry powder form, and adapted to be dissolved in hot or cold water to produce a coffee beverage.

Instant coffee products have gained widespread acceptance in recent years, because of the convenience of use of the product, the ease of preparation of any desired quantity of the beverage, and the fact that special percolators, drip coffee pots, and similar appliances are not required to prepare the beverage. Instant products which for the most part comprise powdered coffee adapted to be dissolved directly in the quantity of water which comprises the beverage, have not gained the public acceptance initially expected for these products, or realized their full market potential, primarily because of the fact that heretofore, these instant coffee products have not produced a beverage having the same aroma and flavor characteristics of a freshly brewed coffee beverage. Various attempts have been made in the past to solve this problem and have not previously been successful.

Nearly all of the major instant dry coffee products now on the market and adapted to be introduced into a quantity of hot or cold water to produce a beverage, are presently processed in accordance with procedures that are similar in many significant respects. These include at least the following: (1) they are all produced by extractions of roasted coffee wherein the water soluble components removed from the ground coffee are present at relatively high concentrations with respect to the liquid phase (in the general range of 20% to 30% concentration; (2) the instant coffee products are produced at high yield (instant coffee solids representing 35% or more of the weight of the initially dry roasted ground coffee); (3) the instant coffee products are all produced in one continuous multiple stage extraction process wherein the extraction liquid is caused to flow in countercurrent relationship to the ground coffee; (4) the soluble coffee components that are important to aroma and flavor are not present in the same relative proportions to each other in the extracts that are produced from the roasted coffee as are the relative proportions of these components to each other as found in a normal brew from the same roasted coffee; and (5) the products produced in accordance with such prior procedures are so similar in properties and characteristics that beverages prepared therefrom have virtually indistinguishable flavor and aroma even though the instant products were made from somewhat different blends of roasted coffee.

The instant coffee products referred to above all are known to have different sensory characteristics than coffee beverages prepared by a fresh brewed procedure. Thus, the beverage prepared from the instant coffee product does not have the same aroma and flavor as a fresh brewed product. It is believed that this common distinctiveness of instant coffee beverages from fresh brewed beverage, is a factor operating to definitely limit the extent of consumer acceptance of instant coffee products in comparison with the acceptance of coffee freshly brewed from roasted ground coffee products.

Heretofore it has been assumed that the distinctiveness of instant coffee beverage from fresh brewed coffee beverage is largely the result of two factors: (1) the fact that instant coffee production involves the extraction of over 35% by weight water solubles calculated on the basis of the initial weight of the dry roasted ground coffee; and (2) the fact that certain desirable aroma and flavor components are lost during drying of the coffee extract and which is necessary to produce the final instant powder that is packaged for commercial distribution. It has now been discovered that a third, and even more important factor is involved in the difference between the flavor and aroma of a freshly brewed coffee beverage and one made from an instant coffee powder, and which has not heretofore been taken into account in the production of instant coffee products. Specifically, it has been found that the most important aroma and flavor components of roasted coffee grounds cannot be properly extracted therefrom at the high water soluble component concentration levels at which present instant coffee processes are operated. When the extraction is carried out at high concentrations of the extracted components, not only are the more important flavor and aroma constituents removed in reduced amounts compared with these same components extracted at a lower concentration, but the relative proportions with respect to each other are materially different than a lower concentration extraction. It is therefore manifest that a beverage prepared from the instant product produced in this way will be different from the standpoint of aroma and flavor than a freshly brewed coffee beverage.

It is therefore the primary object of the present invention to provide a new and improved procedure for preparation of a coffee product suitable for addition to water to make a coffee beverage, and which has substantially the same aroma and flavor characteristics as are found in a freshly brewed coffee beverage prepared from conventional roasted coffee blends.

It is another very important object of the invention to provide a process of producing a coffee product suitable for addition to water to make a coffee beverage wherein a dual extraction procedure is used to produce first, a low concentration coffee extract having high recovery of the most important water soluble constituents therein from the standpoint of flavor and aroma, at relative proportions to each other which do not vary greatly from the relative proportions of these same water soluble components in a freshly brewed beverage, as well as a high water soluble constituent extract which is prepared from the ground coffee after the initial extraction process, so that upon combination of the two extracts, and removal of water therefrom in conventional ways, the final instant coffee product will produce a beverage having substantially greater resemblance with respect to aroma and flavor, to a freshly brewed product than heretofore available instant coffee products.

Freshly brewed coffee beverage normally has a somewhat distinctive taste and aroma depending upon the particular blend of roasted coffee used in preparing the beverage. However, processes heretofore used for the preparation of an instant coffee product have not been capable of producing a material which is distinguishable to any significant extent from the standpoint of aroma and flavor, when added to a quantity of water to produce a coffee beverage, depending upon the particular blend of roasted coffee used in preparation of the instant product. It is therefore, an important object of the present invention to provide a process for producing an instant coffee product that is sufficiently improved over previously used commercial processes that a coffee beverage prepared from the instant product is so much more like a fresh brewed coffee beverage made from the same blend of roasted coffee that differences can actually be detected in the aroma and flavor of the instant coffee beverage depending on the type of roasted coffee blend used in production of the instant product.

In view of the discovery that an instant coffee product can be prepared suitable for making a beverage which is more brew-like than prior instant coffee products, utilizing a procedure wherein an initial extraction operation is performed in which the concentration of the water soluble components removed from the ground coffee is limited to a value within a predetermined range, it is an especially important object of the invention to not only provide an economical and commercially practicable method of obtaining the low concentration first coffee extract, but also a simple, relatively inexpensive and commercially feasible method of concentrating the first extract without deleteriously affecting the valuable constituents in the extract which contribute to the quality of the final product and make it more acceptable to the public.

Another important object of the invention is to provide a procedure for preparing a coffee product adapted to be added to water to make a coffee beverage, wherein the product is available in a form adapted for final processing in various ways including preparation of a dry powder employing conventional spray drying techniques, or dried by freeze drying steps, or even concentrated through freeze concentration procedures to present a liquid product of characteristics requiring that only a small amount of the concentrated product be added to water to prepare a beverage.

Another very important object of the invention is to provide a method of preparing a coffee product suitable for addition to water to make a beverage, wherein effective removal of the most desirable water soluble components in the ground roasted coffee is effected by adding a predetermined quantity of hot water to the ground coffee, and then maintaining the liquid and the coffee in intimate contact for a period, and under generally atmospheric pressure, until substantially equilibrium conditions exist between the water soluble constituents in the extract and the same components remaining in the coffee grounds.

A still further important aim of the invention is to provide a process as referred to above which results in production of a coffee product capable of producing a beverage more like fresh brewed coffee beverage than previously available instant coffee products, and in a form adapted to be dried for sale to the consumer without sacrifice in the desirable characteristics of solubility in hot or cold water, low bulk density, and ready flowability in the package therefor.

Other objects of the present process will be explained in greater detail, or become apparent as the following description progresses.

It has been determined that when roasted ground coffee is extracted with a liquid containing dissolved coffee solids at a concentration level of for example, 6% to 8% of water soluble constituents based on the total weight of the liquid, the sensory qualities of the resulting extract, although somewhat different than those of fresh brewed coffee beverage (at 1% concentration of water soluble components for example) are still definitely of the character of good fresh brew. However, it has further been determined that as the concentration of water soluble constituents in the extract liquid is increased, above the 6% to 8% concentration level, the sensory qualities of the extract from the ground coffee become progressively poorer, until at 15% to 20% concentration, the sensory qualities of the extract are surprisingly little better than those of reconstituted instant coffee powder. Thus, it has been established that much of the sensory inferiority of instant coffee products is associated with the concentration at which the extracts are taken in preparation of the instant product.

The present invention is predicated on the discovery that by utilization of what is designated herein as dual stream extraction, wherein the roasted ground coffee is first extracted at limited concentration of the water soluble constituents in the extract, for maximum recovery of those components which affect the aroma and flavor of the final beverage to the greatest extent, followed by further extraction of the ground coffee to prepare a high concentration liquid for commercially feasible over-all yield, a product may be produced by combining the two extracts in predetermined proportions, which upon drying thereof, may be added to water to prepare a beverage which is significantly more like fresh brewed coffee beverage than any instant coffee product heretofore available.

Although the present process involves the utilization of higher amounts of water for the extraction of the roasted ground coffee than has normally heretofore been used in preparation of commercial instant coffee products, an important features of the present invention is the utilization of concentrating techniques that can be carried out on an economically feasible basis, but which do not significantly affect the extract obtained from the roasted ground coffee, thereby assuring that a beverage prepared from the final product of this process is substantially similar in flavor and aroma to a freshly brewed coffee beverage.

For a better understanding of the procedures employed in preparing the improved coffee product mentioned above, reference is made to the accompanying drawing which schematically illustrates the present process and which is utilizable to produce either dry or liquid concentrates that may be added directly to either hot or cold water. As is apparent in the flow sheet, a hot water line 10 and a roasted ground coffee conveyor or conduit 12 are operably associated with an extractor vessel 14 which normally would have a closed top, but operates at atmospheric or relatively low pressure of the order of 5 to 10 p.s.i.g. Suitable structure is provided within vessel 14 for agitating the contents thereof, and may take the form of a rotatable impeller 16 or equivalent structure. The outlet line 18 leading from the extractor vessel 14 is connected to a continuous separator 20 which is operable to remove a considerable portion of the coffee extract from the grounds discharged from vessel 14. The liquid extract from separator 20 flows to the heat exchanger in the nature of a chiller 22, via line 24, while the extracted coffee grounds pass into the expeller 26 through line 27. The expeller 26, which may be of the auger type for efficient operation, is connected to the series of extractors broadly designated 28 by line 30. The liquid from expeller 26 flows therefrom and into line 24 upstream of chiller 22, via line 31. It is to be explained at this juncture that line 30, in a commercial operation, would extend to a header connected to the upper ends of all of the extractors 28 for selective direction of the coffee grounds into one of the extractor vessels. This arrangement is conventional in coffee extraction processes for the production of instant coffee products, and therefore will not be explained in detail, but the general operation of an extraction system of this type will be explained briefly hereinafter.

A refrigeration system 32 has a main refrigerant line and return 34, as well as a bypass line and return 36 which is connected to the heat exchanger 22 to lower the temperature of the product flowing into the chiller. The outlet of heat exchanger 22 is coupled to the low concentration coffee extract storage tank 38 by connecting line 40. Freeze concentrator 42, connected to the refrigerant supply and return lines 34, receives liquid from the storage tank 38 through line 44. The liquid extract which emanates from concentrator 42 flows into the low concentration extract storage tank 46 via line 48, while the ice collected in the concentrator 42 is discharged therefrom into melter unit 50 by connecting line 52. The water resulting from melting of ice in unit 50 is conveyed to heater 54 by line 56, and a make-up water line 58 is joined to line 56 intermediate melter unit 50 and heater 54. Steam is supplied to the heat exchangers defining melter unit 50 and heater 54 by boiler 60 having steam supply and return lines 62 extending to the exchange tubes of melter 50 and heater 54. In the schematic representation shown in the drawing, the water emanating from heater 54 flows into the bottom of extractor vessel 64 via line 66. In actual practice, the line 66 is also connected to a header coupled with all of the vessels making up extractors 28, so that water may be selectively directed into the lowermost of any one of the vessels.

The storage tank 46 is also connected to a blender unit 68 through the provision of line 70 therebetween.

It is also contemplated that the liquid from freeze concentrator 42 passing through line 48, may be directed through bypass line 72 into a freeze dryer 74, or alternately, via bypass line 76 into a concentrated liquid production assembly 78.

The series of extractors 28 are arranged in series relationship for countercurrent movement of the extraction liquid with respect to the coffee grounds, and therefore for purposes of the schematic representation of the drawing, a line 80 is shown as interconnecting the top of extractor vessel 64 with the lowermost extremity of the next adjacennt extractor vessel 82, a line 84 is provided for communicating the upper extremity of vessel 82 with an adjacent extractor vessel 86, while line 88 serves to join the top of vessel 86 to the lower extremity of the final extractor vessel 90. However, as previously explained, a series of headers are in fact used to communicate the line 30 and line 66 with the extractor vessels, so that the relationship of the vessels may be cyclically varied during operation of the production apparatus. Control valves are also provided in association with the headers for selectively controlling flow of liquid through the various extractor vessels, and it is to be further understood that the line 30 is employed to schematically represent the way in which ground coffee from the expeller 26, is directed into a particular vessel depending upon which vessel has previously received ground coffee from the expeller. Furthermore, although not indicated directly in the schematic represenntation, it is to be understood that the lower extremities of each of the extractor vessels are provided with means for discharging spent grounds therefrom, and therefore to illustrate this, a line 92 is shown extending from the lower extremity of vessel 64 and which is labeled as the spent grounds outlet. By virtue of this arrangement, it is not necessarily to transfer coffee grounds from one vessel to another during the processing operation, while at the same time maintaining true countercurrent flow of extraction liquid with respect to the coffee grounds.

The outlet line 94 from the upper extremity of vessel 90, as illustrated schematically in the drawing, extends to a flash evaporator 96 provided with a vapor outlet line 98 and a product discharge line 100 extending therefrom in opposite directions. The liquid collected in flash evaporator 96 and discharged therefrom through line 100, is conveyed to a high concentration extract storage tank 102. The liquid from tank 102 is then directed into an evaporator in the nature of a concentrator 104 via line 106 and which receives steam from the boiler 60 via supply and return lines 108. Water vapor from concentrator 104 is removed therefrom through line 110 while the concentrated extract flows from the evaporator 104 through line 112 directly into the high concentration extract storage tank 114. Line 116 serves to communciate tank 114 directly with the blender 68. After blending of the extracts, the blend is conveyed to spray dryer equipment broadly designated 118 by line 120.

In order to simplify the process flow sheet, none of the valves and pumps actually associated with this equipment have been illustrated, but it is to be understood that valves and pumps are employed where needed to regulate flow of the various liquids, and that the process is carried out on substantially a continuous basis through employment of suitable control units and mechanism associated with the control valves, and operated at proper intervals and in required sequence.

In describing a typical operation involving dual extraction of the ground coffee in accordance with the preferred concepts of this invention, it is initially to be assumed that the roasted coffee is made up of a preferred blend of ground coffee beans. Thus, water at a temperature of about 210° F. is directed into extractor vessel 14 via line 10 in association with ground coffee which is conveyed into vessel 14 through conduit 12. The coffee in the example set forth herein may be ground to a size conventionally known as percolator grind with 1 part of the ground coffee by weight being conveyed into extractor 14 for each 3 parts by weight of hot water directed thereinto. The impeller is normally operated continuously to effect rapid admixing of the water in the coffee and to maintain the water in intimate contact with all particles of the ground coffee through the extraction period. As previously noted, the interior of extractor vessel 14 is at atmospheric or relatively low pressure, the hot water dissolves water soluble components from the ground coffee, and the batch of water and coffee grounds are maintained in extractor vessel 14 for a time period sufficient to establish substantially equilibrium conditions between the water soluble components dissolved in hot water and the same components which remain in the ground coffee. This establishment of equilibrium conditions in the extraction liquid is extremely important to the present process to assure final production of an instant coffee product that will produce a beverage having an aroma and flavor more closely related to freshly brewed coffee beverage than has heretofore been possible. With a water to ground coffee ratio of about 3:1, it has been determined that the concentration of water soluble coffee components in the extract in vessel 14 at the time equilibrium exists between the water soluble components in the coffee, and the same components in the extract, will be about 7%. Furthermore, tests have shown that the equilibrium condition will obtain within a time period of about 10 minutes for the grind specified. For a coarser coffee grounds a somewhat longer extraction time will obviously be required. The coffee extract and the coffee grounds are dumped from vessel 14 into continuous separator 20 where the major portion of the liquid extract is separated from the coffee grounds and then conveyed into low concentration extract storage tank 38. The temperature of the liquid is lowered to about 40° F. by passage through the heat exchanger 22. The dewatered coffee grounds are then subjected to maximum expulsion of water therefrom by direction of the coffee into expeller 26 which removes most of the water from the coffee grounds through employment of pressure mechanism such as an auger or the like. Next, the dewatered coffee grounds are directed into one of the extractor vessels forming the series of extractors 28, and as schematically illustrated in the flow diagram, the grounds are conveyed into the last vessel of the train designated by the numeral 90.

Returning to the liquid extract contained in storage tank 38, this liquid is then directed into the freeze concentrator 42 which is of the type used to partially freeze the water in various types of liquid food products to increase the concentration of the product. The ice which collects in concentrator 42 is removed therefrom in a conventional manner and directed into the melter unit 50, and then directed to the extractor vessels 28 for deep extraction of the coffee grounds. By utilization of melter unit 50, the amount of water used in the system is maintained at a minimum and any coffee solubles entrained in the ice are recovered by direction of the water containing the coffee to extractors 28 which operate as filters in this respect.

The freeze concentrator 42 should be capable of increasing the relative concentration of water soluble coffee components in the liquid to a level of about 15% to 20% by weight of the liquid. In this respect, a recycle system may be employed in conjunction with the freeze concentrator, to assure increases in concentration of the water soluble components in the solution to a required level. The extract from concentrator 42 is then conveyed into storage tank 46 which is defined as the low concentration extract storage tank even though the concentration of the water soluble components in the extract is higher than initially extracted in vessel 14, because the concentration of this extract is substantially lower than the concentration of water soluble components contained in the extract stored in vessel 114.

The deep extraction process is carried out by causing water to flow from melter 50 as well as external water supply line 58, through heater 54 to raise the temperature of the water to a level as high as 350° F. The hot water is then successively directed through extractor vessels 64, 82, 86 and 90 which are arranged in series relationship whereby the water first contacts coffee grounds which have been previously extracted to the greatest extent, and thereby assuring that the extraction liquid last contacts the freshest coffee grounds. This procedure per se is old in the art and results in preparation of a liquid coffee extract having a concentration of water soluble coffee components therein at a level of about 15% by weight of the extract. However, it is to be remembered that the most important flavor and aroma constituents of the coffee from the standpoint of preparation of a final beverage having an aroma and a flavor essentially similar to fresh brewed coffee beverage, have previously been extracted from the ground coffee in the extractor vessel 14. The emanating from vessel 90 is attributable to the fact that the concentration of water soluble constituents in the extract the concentration of water soluble coffee components in the extraction liquid progressively increases as the extract passes through the vessels 64, 82, 86 and 90 arranged in series relationship, and thereby permitting greater quantities of water soluble components to be dissolved in the extract during each successive stage, as equilibrium conditions between the water soluble components in the extract and those remaining in the ground coffee, are approached during each pass of the liquid through a respective bed of coffee grounds.

The liquid extract emanating from the last stage of the extraction process is at a temperature of about 250° F., and is conveyed into flash evaporator 96, to permit water vapor to be removed from the extract and thereby concentrating the extract to a certain degree. The liquid is immediately conveyed into the high concentration extract storage tank 102 where the liquid may then be conveyed into the evaporative concentrator 104 which receives heat from boiler 60 and wherein a substantial vacuum is placed on the liquid therein. The concentration of the extract from storage tank 102 may be accomplished without fear of destroying the valuable aroma and flavor factors in the extract, since these were removed in the extractor vessel 14, and the first extract which contains these valuable constituents is not subjected to high temperatures or any other physical operation which would be deleterious to the water soluble constituents in the extract. Therefore, the concentration of the extract contained in tank 102 can best be accomplished in an economical manner by utilization of an evaporative concentrator that provides adequate means against fouling of the heat transfer surfaces such as a wiped-film evaporator. In any event, it is preferred that the concentrator 104 be capable of increasing the concentration of the water soluble components in the discharge extract from the evaporator, to a level of about 40% by weight. Thus, this high concentration extract is introduced directly into the storage tank 114 next to the storage tank 46. The extracts in tanks 46 and 114 are then directed into blender 68 in the proportion in which they are produced. In the example used for this illustration, it is preferred that sufficient water be removed from respective extracts to cause the concentration of water soluble components in the output from blender 68 to average 29% by weight of the blend, and thereby producing a yield of 45% with respect to the weight of the ground coffee initially directed into extractor vessel 14. Spray drying equipment 118 may then conveniently be employed to dry the extract and to produce a final coffee product suitable for direct addition to water, either hot or cold, to make a coffee beverage. However, it can be seen that the concentration of water soluble components in the blended extract conveyed to the spray dryer may be changed as desired by simply altering the amount of water removed from the high concentration extract and the low concentration extract. The dry product emanating from dryer equipment 118 compares in all respects to other dry instant coffee products heretofore prepared, with respect to solubility in water, bulk density, and flowability in the production process and in the package therefor.

It should also be noted at this juncture that the equipment illustrated schematically in the drawings represents apparatus which would be used in a process in accordance with the preferred concepts of this invention but it is to be understood that not all of the equipment illustrated is necessary to the practice of an operable process. Similarly, other pieces of equipment could be employed in lieu of those shown to perform equivalent operations. For example, the separator 20, melter unit 50 and flash evaporator 96 could be eliminated entirely without impairing the operability of the process. However, it would be necessary in these circumstances to alter certain operating conditions and possibly steps of the process to assure production of a high quality product, all of which would be well within the capabilities of those skilled in this field.

Since the equipment illustrated in the drawings and described above has the capability of producing a high concentration extract, a low concentration extract, a blend of the high concentration extract and the low concentration extract, a freeze dried product, either from the high or low concentration extracts or both, a concentrated liquid product from either the high concentration extract, the low concentration extract or both, and a spray dried product from the low concentration extract, the high concentration extract or both, it is apparent that at least the following different products may be prepared which are suitable to be added to cold or hot water to produce a coffee beverage. This list however, is not to be considered the only combinations possible from the present process.

(1) The low concentration extract from tank 46 may be combined with the high concentration extract from tank 114 and then spray dried in dryer 118 as suggested in the schematic diagram;

(2) The low concentration extract which normally would flow into tank 46 may be freeze dried in dryer 74 and the dry product combined with a spray dried product obtained by direction of the high concentration extract in tank 114 to dryer 118;

(3) The low concentration extract which would normally be directed to tank 46 may be freeze dried and then packaged for sale;

(4) The low concentration extract in tank 46 may be sent directly to the spray dryer 118 to produce a spray dried product ready for sale;

(5) The high concentration extract and the low concentration extract which would normally be directed to tanks 114 and 46 respectively may be combined and dried in freeze dryer 74;

(6) The low concentration extract which would normally be directed to tank 46 may be further concentrated and sold as a liquid product; and (7) The low concentration extract and the high concentration extract which would normally be directed to the tanks 46 and 114 respectively may be further concentrated and the combined blend sold as a liquid product.

The operating conditions and processing parameters of the present method may also be altered without departing from the basic concepts of this invention. For example, the first extraction has been described as being carried out as a batch operation using an extraction vessel. This step could obviously be done in a slurry extractor on a continuous basis, or a column could be used of types making up the series of extractors 28. Different granulations of coffee may be used. However, the largest particles of the roasted coffee should preferably be capable of passing through an 8 to 12 size screen. Where coarser grind coffee of this type is used, the water in vessel 14 should be maintained in contact with the grounds for a longer period, as for example, about 30 minutes. The temperature of the water directed into vessel 14 may also be varied within at least certain limits and it has been determined that the water temperature may certainly be within the limits of 190° F. to 250° F. The higher temperatures are obtained by extracting the water soluble components from the grounds in vessel 14 under a moderate pressure of from 5 to 10 p.s.i.g.

Similarly, the temperature of the water directed into extractors 28 via line 66 may be varied within certain limits, as for example from 300° F. to 350° F., thereby causing the temperature of the extract emanating from extractor 90 to be within a range of about 175° F. to 250° F. The lower temperature would especially be required if flash evaporator 96 was eliminated from the processing equipment.

Another variable is the amount of water removed from the extracts as previously explained and depending on the final product desired. For example, the amount of water removed from the high concentration extraction directed into evaporator 104 may be readily controlled to give a liquid extract directed into tank 114 which has a concentration of water soluble components within the range of 25% to 35%.

The previously specified water to coffee ratio of 3:1 which gives a 7% concentration extract may be varied between the limits of 2.5:1 to 4.5:1 thereby producing a low concentration extract having from 5% to 10% by weight of water soluble constituents in solution therein. By the same token, the water to coffee ratio of the high concentration extraction carried out in extractor 28 may be varied to give an extract effluent from extractor 90 having a water soluble component concentration of from 10% to 20% by weight of the liquid.

With the end objective of the present process being a coffee product having sensory properties significantly more like those of a normal freshly brewed coffee product made from the same blend of roasted coffee, the importance of initial extraction of the ground coffee to prepare a first extract having a relatively low concentration of water soluble components therein, and wherein the extraction is carried out until equilibrium conditions are obtained in the extractor, can best be explained when the following factors are noted. Roasted ground coffee normally contains about 25% of materials that are readily extractable with hot water at atmospheric pressure and at normal brew concentration. Of these water soluble components in the roasted coffee, which are extractable with hot water, some are more readily soluble in the hot water than are others, some are more important to the characteristic aroma and flavor of brewed coffee than are others, and a number of the water soluble components that are extractable with the hot water and that are of importance to brew aroma and flavor, also are somewhat less extractable than are other water soluble components. In the normal brewing of roasted ground coffee to prepare a brewed beverage (wherein the total dissolved coffee solubles in the solution are usually in a concentration range of about 0.75% to 1.25% by weight of the brewed beverage) that spectrum of water soluble components are recovered in the brew that defines the maximum brew likeness obtainable from the particular roasted ground coffee that is used; thus, the various water soluble components that are recovered in this concentration range are in the relative proportions to each other that define maximum brew likeness. It can therefore be preceived that when the concentration at which the roasted ground coffee is extracted is increased to a significantly higher figure than about 1% total dissolved coffee solubles, the resulting extract, upon reconstitution to normal beverage strength, varies to a certain extent in regard to the brew likeness of the product, depending upon the concentration level of water soluble components in the extract. It has now been determined that when the concentration of water soluble components in the extract is maintained at a level below about 10%, and preferably no more than about 7%, there is only little change in the relative proportions of the various extracted solubles in the extract that contribute to the aroma and flavor characteristics of the beverage prepared by introduction of the concentrated extract into a quantity of water. For this reason, with increasing concentrations at which the roasted coffee is extracted above about 7% to 10%, the resulting extracts (upon reconstitution to normal beverage strength) show aroma and flavor spectrums that become less and less like that of normal brewed beverage. It is believed that with increasing concentrations of the water soluble components in the extract, above a level of about 7%, and particularly above 10%, changes are occurring in the relative proportions (to other water soluble constituents in the ground coffee) of the various water extracted solubles that define brew likeness. Tests have shown that at concentrations up to about 7%, and under some circumstances up to about 10%, the resulting extracts obtained from the ground coffee, upon reconstitution to normal beverage strength, definitely are brew-like in aroma and flavor, although extracts of the 10% concentration level are somewhat less brew-like than extracts taken at a lower concentration. For this reason, concentrations of extracts taken at a level of about 12% to 15% of water soluble components in the liquid, produce products which are significantly less like freshly brewed coffee beverage, and instead, become more like current instant coffee beverages in aroma and flavor characteristics. As an explanation of decrease of brew likeness of the instant product, as a function of the concentration of the extract recovered from the roasted coffee in preparation of the instant coffee product, it is believed that as the concentration of the water soluble components in the extraction liquid increases, the increasing concentration favors the extraction of the more readily soluble materials in the roasted coffee, and conversely, suppresses the recovery of some of the less readily soluble materials which, however, are important to flavor.

The importance of extracting the water soluble components from the roasted ground coffee at a limited concentration of the water soluble coffee components, also must be related to the concept of assuring that the low concentration extract reaches equilibrium conditions between the water soluble components in the roasted ground coffee and those which have dissolved in the first extract. When complete equilibrium is not reached between the water soluble components that are still in the roasted coffee particles and those that are dissolved in the extract, then the water soluble components in the solution will be disproportionately higher in the more readily soluble materials. Extracting equipment employing a series of vessels each containing a static bed of roasted ground coffee and through which hot water is passed, normally is not capable of permitting establishment of equilibrium conditions between the water soluble components in the extraction liquid, and those same components in the ground coffee, because the extract contains water soluble components at a concentration which is an average of some higher and some lower concentrations. Therefore, it can be seen that the portions of the final extract taken at higher than average concentrations will be less brew-like than an extract taken at the same over-all concentration under equilibrium conditions.

The practicality from a commercial standpoint of the present process is predicated on the surprising discovery that when an initial extraction is carried out under equilibrium conditions to remove the most flavorful components from the roasted ground coffee, and then another deep extraction carried out to remove a substantial quantity of the water soluble components in the ground coffee, the extract may then be concentrated, blended and dried to produce a product which, when added to water to prepare a coffee beverage at normal strength, results in a beverage which has flavor and aroma characteristics more like freshly brewed coffee than any previously prepared instant coffee product, notwithstanding the inclusion in the material of a dried extract obtained from deep extraction of the roasted ground coffee. In this manner, a product may be prepared having the required bulk density in final form, but wherein the components which operate to give the beverage prepared therefrom substantially the same aroma and flavor as freshly brewed coffee, are not in any way masked or deleteriously affected by other coffee solubles present in the instant product. This is true even though the liquid extracts are dried in a conventional spray dryer which gives the product required bulk density, flowability, and solubility in either hot or cold water.

I claim:

1. A method of producing a coffee product suitable for addition to water to make a coffee beverage and having substantially the aroma and flavor characteristics of a freshly brewed coffee beverage, said method comprising the steps of:

adding from about 2.5 parts to about 4.5 parts of water at a temperature of approximately 190° F. to 250° F. to about 1 part of ground coffee to effect dissolution of water soluble components of the ground coffee to an extent to produce a first extract having approximately 5% to 10% by weight of said components therein when substantially equilibrium conditions exist between said components extracted from the ground coffee and present in said water and the same components remaining in the ground coffee;

maintaining the water in contact with said ground coffee and at said temperature until said substantially equilibrium conditions are reached within about 10 minutes;

separating said first extract from the ground coffee;

freeze concentrating the first extract to a concentration of water soluble coffee components therein of about 15% to 20% by weight;

subjecting the ground, previously extracted coffee to a series of successive water extractions with water comprising melted ice from the above freeze concentration step to remove sufficient water soluble components therefrom to produce a final second extract having a concentration of said components therein of from about 10% to about 20%; the temperature of the extracting water being initially from 300° F. to 350° F. and finally from 175° F. to 250° F.;

concentrating said second extract to a level of water soluble coffee components of 25% to 35%;

combining certain proportions of said first and second extracts; and drying the combined extracts to produce said product.

2. A method of producing a coffee product suitable for addition to water to make a coffee beverage and having substantially the aroma and flavor characteristics of a freshly brewed coffee beverage, said method comprising the steps of:

adding about 3 parts of water at a temperature of approximately 210° F. to about 1 part of ground coffee having a size of percolator grind to effect dissolution of water soluble components of the ground coffee to an extent to produce a first extract having approximately 7% by weight of said components therein when substantially equilibrium conditions exist between said components extracted from the ground coffee and present in said water and the same components remaining in the ground coffee;

maintaining the water in contact with said ground coffee and at said temperature until said substantially equilibrium conditions are reached within about 10 minutes;

separating said first extract from the ground coffee;

freeze concentrating the first extract to obtain ice and the first extract with a concentration of water soluble coffee components therein of about 15% to 20% by weight;

melting the ice from the previous step to obtain extracting water for the next step;

subjecting the ground, previously extracted coffee to a series of successive water extractions with water comprising melted ice from the above step to remove sufficient water soluble components therefrom to produce a final second extract having a concentration of said components therein of about 15%; the temperature of the extracting water being initially from 300° F. to 350° F. and finally from 175° F. to 250° F.;

concentrating said second extract to a level of water soluble coffee components of about 40% by weight;

combining certain proportions of said first and second extracts to form a combined extract having a level of water soluble coffee components of about 29% by weight;

drying the combined extracts to produce said product in a yield of 45% with respect to the weight of the ground coffee used in the first step above.

References Cited

UNITED STATES PATENTS

| | | | |
|---|---|---|---|
| 2,380,046 | 7/1945 | Huguenin | 99—71 |
| 2,408,260 | 9/1946 | Kellogg | 99—71 |
| 2,949,364 | 8/1960 | Bilenker | 99—71 |

MAURICE W. GREENSTEIN, Primary Examiner